July 18, 1961　　　E. W. LIVENSPARGER　　　2,992,848
RECEPTACLE LIFTER

Filed July 16, 1959　　　　　　　　　　　3 Sheets-Sheet 1

INVENTOR.
Edward W. Livensparger,
BY
John A. Leonard,
His ATTORNEY.

July 18, 1961

E. W. LIVENSPARGER 2,992,848

RECEPTACLE LIFTER

Filed July 16, 1959

INVENTOR.
Edward W. Livensparger,
BY
John H. Leonard,
his ATTORNEY.

United States Patent Office 2,992,848
Patented July 18, 1961

2,992,848
RECEPTACLE LIFTER
Edward W. Livensparger, 1887 E. 101st St.,
Cleveland 6, Ohio
Filed July 16, 1959, Ser. No. 827,475
5 Claims. (Cl. 294—34)

This invention relates to culinary appliances and more particularly to instruments used for lifting or carrying hot containers such as pans, dishes, plates, and the like.

Heretofore, holders of this character usually included a longitudinal frame having a handle at one end and a stationary plate or pan gripping member at the other end. Disposed on the frame intermediate the handle and the stationary gripping member was a second coacting gripping member which was longitudinally slidable on the frame toward and away from the first gripping member. Each of the gripping members was provided with relatively rigid gripping jaws adapted to underlie the dish or pan, or the annular flange about the upper end thereof, when the two gripping members were moved toward each other into gripping position.

One of the main difficulties of such prior holders is that they do not grasp and hold the pan or dish tightly and firmly under all operating conditions.

More specifically, such prior holders lack means for retaining the movable member tightly against the dish in the event that the dish inadvertently shifts or slips slightly from its originally engaged position between the gripping members.

An object of the present invention is to provide a holder which retains a firm and positive grip on the pan or dish under all operating conditions.

A further object of the invention is to provide a pan and dish holder including opposed coacting gripping members wherein one of the gripping members is spring biased toward the other gripping member with sufficient force to be moved positively by the spring from inactive to gripping position and then held by the spring firmly in the gripping position.

A further object of the invention is to provide a pan and dish holder including opposed coacting gripping members, each of the members having gripping fingers mounted on a common arc-shaped base, such base being curvilinear and concave toward the pan axis so as to conform approximately to the annular shape of the dish or pan, and being relatively stiff but resiliently flexible in a manner to be flexed by the spring about an axis parallel to the pan axis and thus be caused by the spring to conform to the configuration of the dish or pan.

A further object of the invention is to provide a pan and dish holder including opposed coacting gripping members with each of the members having gripping fingers mounted on a common arc-shaped base, each of such fingers being flexible about an axis parallel or approximately parallel to the plane of the dish to retain a strongly biased grip on the pan or dish under all operating conditions of the holder.

A further object of the invention is to provide a pan or dish holder that may be easily manufactured from inexpensive parts, that is simple to operate, and is dependable in operation.

Briefly, the foregoing objects are accomplished by the provision of a pan or dish holder including a longitudinal frame having a stationary pan gripping member disposed at one end thereof, with the other end of the frame forming a handle for the holder. A movable pan gripping member is disposed on the frame intermediate the handle and the stationary gripping member and is longitudinally slidable on the frame toward and away from the stationary gripping member. Each of the gripping members comprises a resilient base which is curvilinear about an upright axis normal to the frame and concave toward the other gripping member. Each member has depending resilient gripping fingers having gripping hook portions at their lower ends. The fingers are adapted to underlie the dish or the upper radial annular flange or rim thereof in gripping relation.

A plurality of means are provided for insuring a tight and firm grip of the dish or pan under all operating conditions. Specifically, the movable gripping member is spring biased toward the stationary gripping member such that the dish or pan is retained between such members under a strong spring bias under all operating conditions. Additionally, the curvilinear base of each of the gripping members is connected at its mid-portion to the frame, but has its ends free, and is formed of a resilient material. As a result, the base may flex about an upright axis to conform to the annular configuration of the dish or pan, whereby each of the gripping fingers on the base may resiliently and firmly grip the periphery of the dish snugly.

Also, each of the depending gripping fingers is formed of a resilient material to provide an additional biasing or flexing means whereby the fingers may flex about axes parallel to the plane of the pan into positions in which they tightly and firmly grip the periphery of the dish or pan independently of the base flexure means aforedescribed. With this construction, there is provided a dish or pan holder having three separate, yet positive, means for applying gripping forces to the pan or dish under all operating conditions regardless of the configuration of such pan or dish.

Other objects and advantages of the invention will become apparent from the following description taken in conjunction with the drawings, in which.

Figure 1:
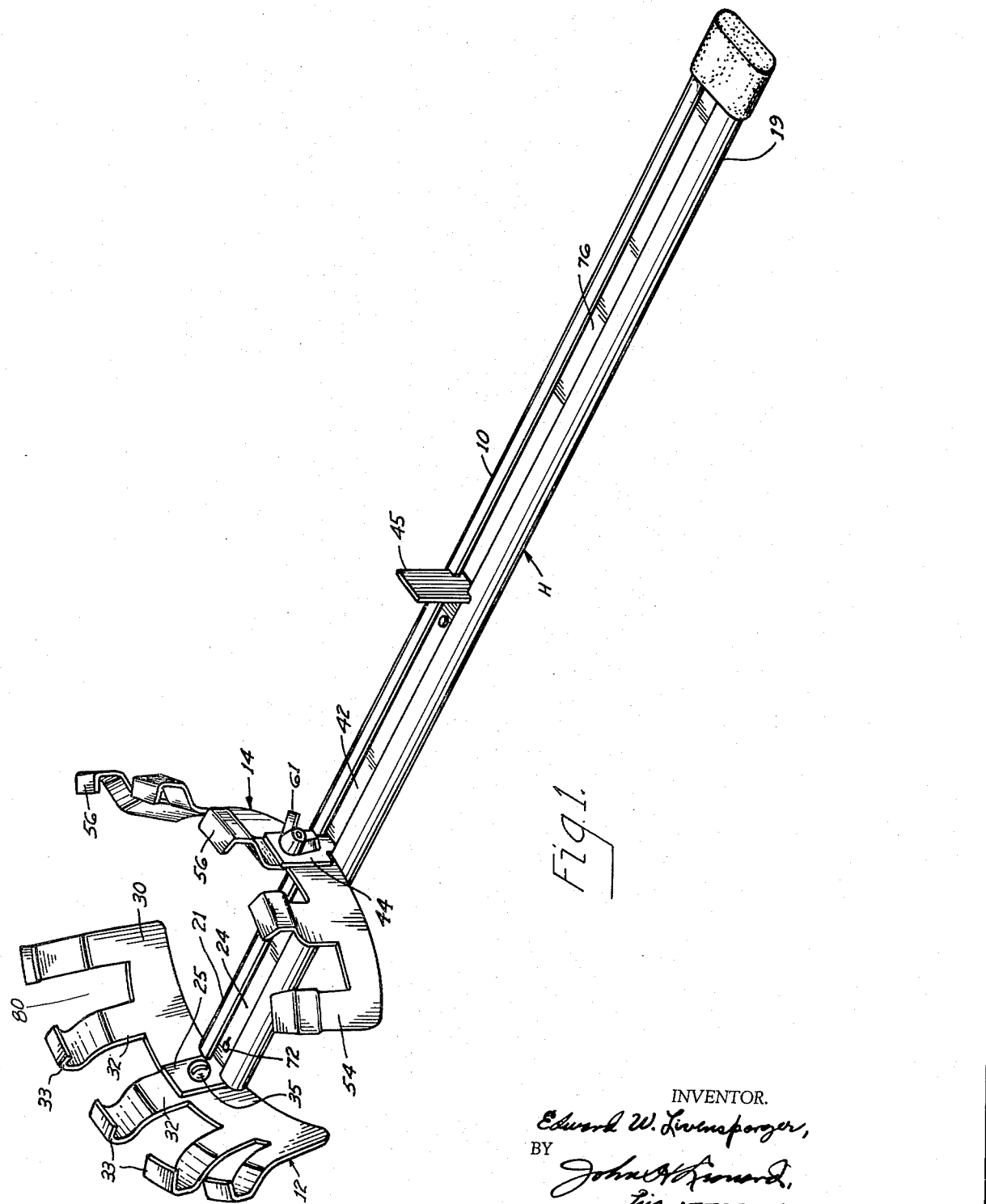
FIG. 1 is a perspective view of a pan holder constructed in accordance with the invention and shown in inverted condition for clearness in illustration.

Although the invention is shown and described herein with reference to a holder for gripping hot pans and dishes, it will be understood that such holder may be used for gripping and retaining any similar type of annular object or container which cannot be conveniently handled manually.

Referring to the drawings, the pan holder H of the invention, in the illustrative example shown and described herein, comprises broadly the longitudinal frame or handle 10 having the stationary gripping member 12 secured to one end of the frame, and a movable gripping member 14 slidably mounted on the frame, for movement longitudinally thereof, intermediate the ends of the frame in coacting spaced relation to the stationary gripping member 12.

Figure 2:
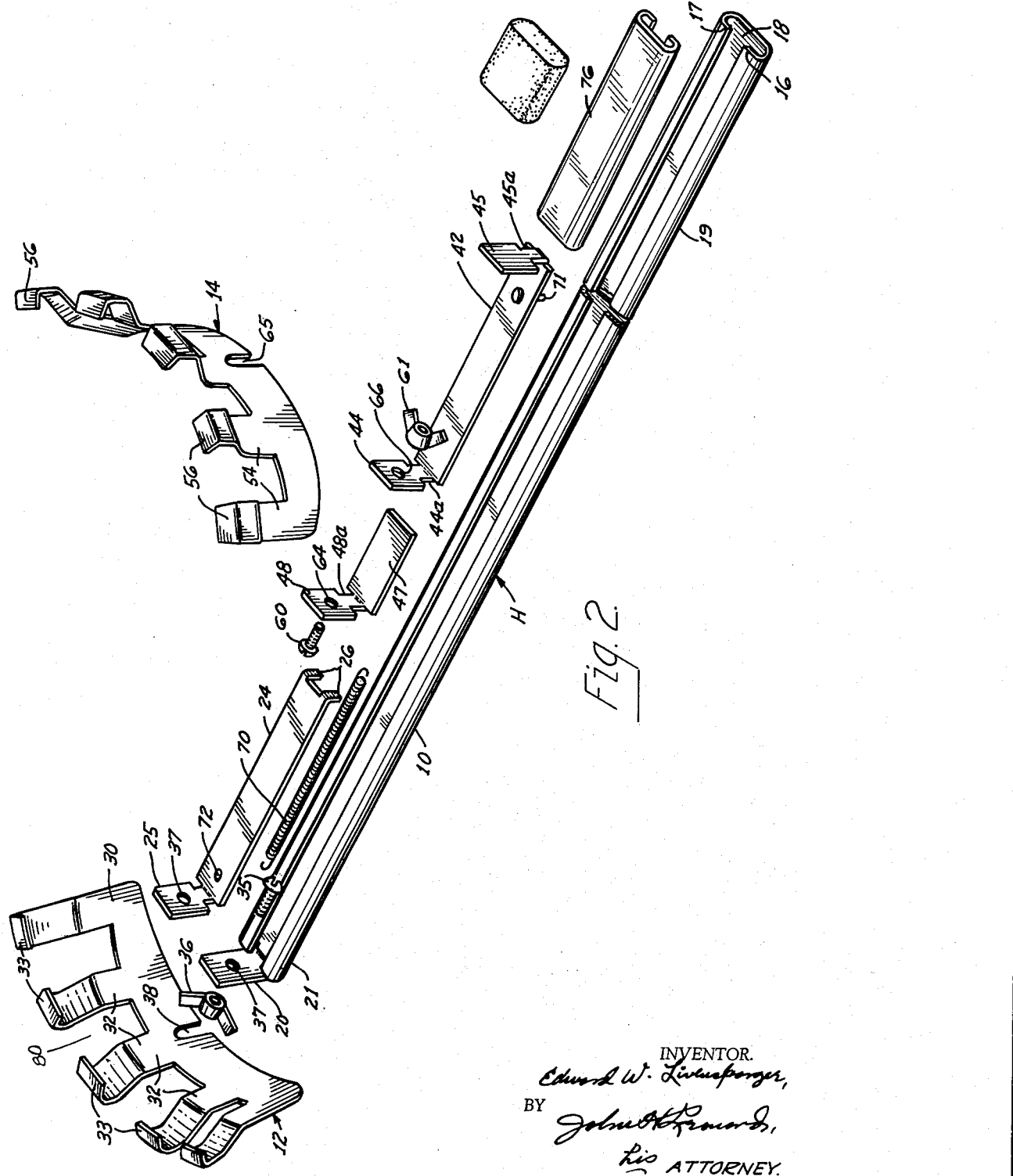
FIG. 2 is a perspective view of the various parts of the holder shown in FIG. 1, and showing such parts in inverted position prior to the assembly thereof.

The frame or handle 10, in the present instance, is formed of a conventional curtain rod having a C-shaped configuration in transverse section to form the spaced tracks or flanges 16 and 17, which define a partially enclosed trough or slideway 18, as shown in FIG. 2. The end portion 19 of the frame forms the handle of the holder H. A portion of the bottom wall of the trough 18 extends beyond the flanges and provides an outwardly projecting mounting lug 20 at the other end 21 of the frame. The lug 20 projects from the bottom of the trough 18 at substantially a right angle in a direction toward and beyond the face of the frame defined by the flanges 16 and 17.

Disposed within the trough or slideway 18 at the end 21 of the frame is a mounting bracket 24 having an outwardly projecting mounting lug 25 extending from the bracket at substantially a right angle. The bracket 24 may contain one or more outwardly extending tangs 26 to retain the bracket within the trough 18 with a tight frictional fit.

When the bracket 24 is so positioned within the trough 18, the lug 25 thereon is disposed in spaced parallel relation to the lug 20, there being a slight gap or space between such lugs for receiving the stationary gripping member 12, now to be described.

The stationary gripping member 12 comprises a generally elongated, arc-shaped, resilient base portion 30, preferably of sheet metal, having a plurality of flexible gripping fingers 32 along one side thereof in edgewise spaced relation to each other endwise of the base. Each of the fingers 32 includes an end hook portion 33 suitably configured for gripping a pan or dish, as shown. The member 12 is mounted on the frame 10 between the lugs 20 and 25 and is secured therebetween by the bolt 35 and the wing nut 36, said bolt passing through the aperture 37 in the lug 25, through the slot 38 in the base 30, and thence through the aperture 39 in the lug 20.

Slidably disposed in the trough 18 intermediate the ends of the frame 10 is a U-shaped bracket 42 having the outwardly projecting lugs 44 and 45 extending from each end of the bracket, respectively, at substantially a right angle. The lugs 44 and 45 are connected to the bracket 42 through necked-down portions 44a and 45a, respectively, such necked-down portions being interposed between the opposed flanges 16 and 17 of the frame 10, thereby permitting the main portion of the bracket 42 to slide longitudinally in the trough 18 with the lugs 44 and 45 being disposed exteriorly of the trough and frame, as shown. The lug 45 functions also as a finger grip for the movable member 14, as will be hereinafter described.

Underlying the bracket 42 is an L-shaped bracket 47 having a lug 48 extending outwardly from the one end thereof at substantially a right angle, as shown. The lug 48 is connected to the bracket 47 through the necked-down portion 48a which functions in the same manner as the necked-down portions 44a and 45a, aforedescribed. Thus, when the brackets 42 and 47 are operatively disposed in the trough 18, the lug 48 is positioned in spaced parallel relation to the lug 44, there being a slight gap or space between such lugs for receiving the movable gripping member 14, now to be described.

The movable gripping member 14, in the preferred form, is constructed the same as the stationary member 12 and includes a resilient, generally elongated, arc-shaped base portion 52 having a plurality of flexible gripping fingers 54 extending from one edge of the base portion and in edgewise spaced relation to each other in a row extending endwise of the base. Each of the fingers 54 includes an end hook portion 56 suitably configured for gripping a pan or dish, as shown. The movable member 12 is mounted on the frame 10 between the lugs 44 and 48 and is secured therebetween by the bolt 60 and the wing nut 61, said bolt passing through the aperture 64 in the lug 48, through the slot 65 in the base 52, and thence through the aperture 66 in the lug 44.

Figure 4:
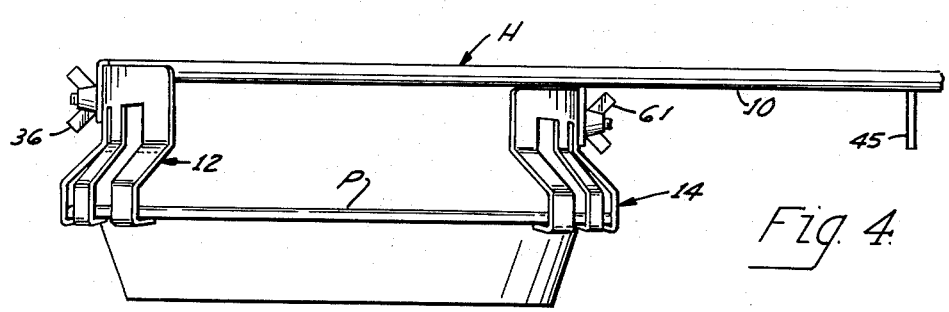
FIG. 4 is a side elevation of the holder shown in FIG. 3.

FIG. 4 shows the holder H in normal operating position wherein the gripping members 12 and 14 depend from the frame 10.

In the preferred form, the movable member 14 is biased toward the stationary member 12 by suitable resilient means. In the present instance, this is effected by a coil spring 70 which is connected at one of its ends to the nib or projection 71 on the bracket 42, the other end of the spring being threaded through the aperture 72 in the bracket 24 for connection thereto.

Figure 5:
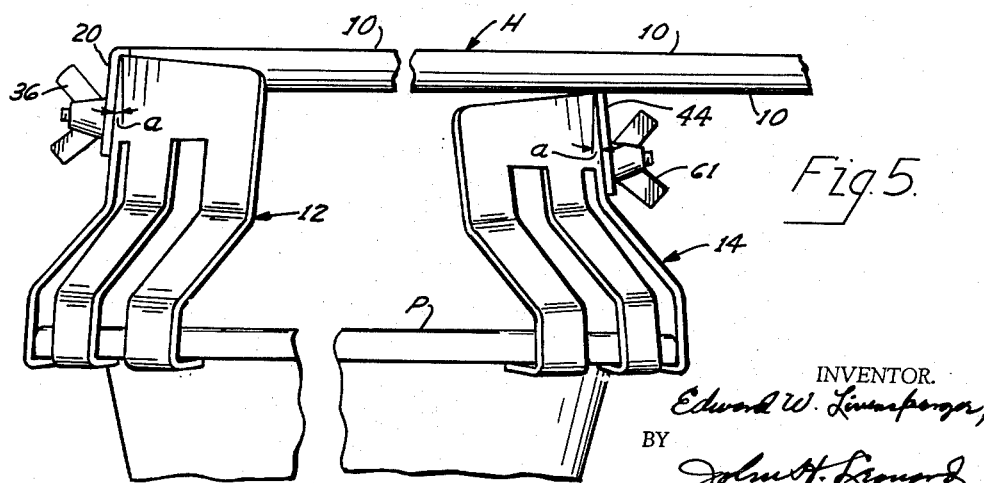
FIG. 5 is an enlarged broken side elevation of the gripping members of the holder shown in FIG. 4.

As shown most effectively in FIG. 5, the mounting lugs 20 and 25, and the lugs 44 and 48 extend not only downwardly but outwardly a slight amount from the center of the pan P to form an angle "a" with the vertical, as shown. With this construction, the weight of the pan plus its contents creates a moment of force on the fingers that is directed inwardly towards the center of the pan P, said force tending to additionally bias the fingers inwardly into tighter gripping relation with the pan.

Figure 3:
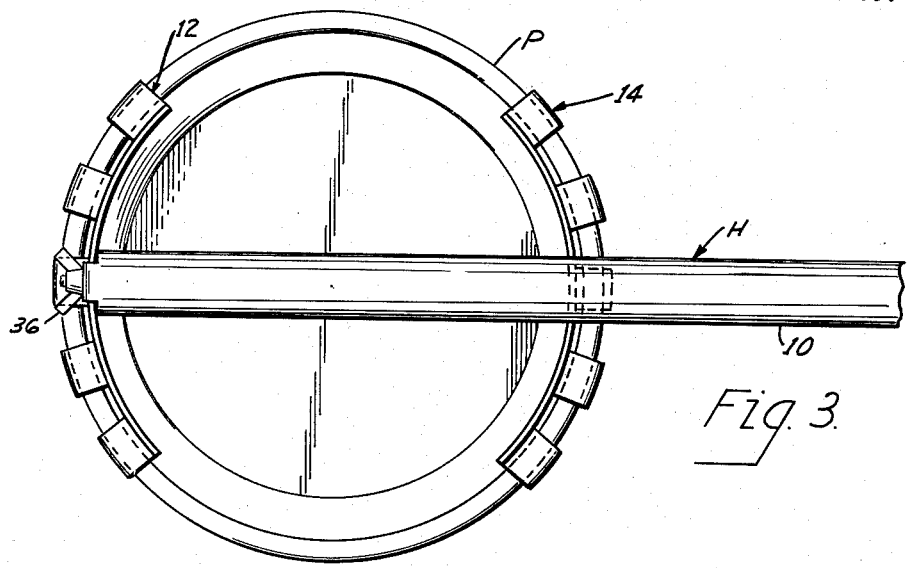
FIG. 3 is a fragmentary top plan view of the gripping portion of the holder shown in FIG. 1, and showing such holder gripping a pan in operating position.

The gripping members 10 and 12 are formed of a suitable resilient material having predetermined flexure characteristics such that when the holder H is gripping a pan P, as shown in FIGS. 3 and 4, the arc-shaped bases 30 and 52 will be flexed by the spring 70 about an axis parallel to the pan axis, into conformance with the pan P, as shown. Additionally, such resilient material enables each of the fingers 32 to flex about axes parallel to the pan in a manner permitting each of the fingers to tightly and firmly grip the edge of the pan. One example of a suitable resilient material is thin sheet aluminum about .032 inch thick and 0.75 hard.

As aforementioned, the lug 45 functions as a finger grip for the movable member 14. More specifically, the lug 45 comprises a handle for moving the movable member 14 away from the stationary member 12—the spring 70 functioning to draw these two members together when the lug or handle 45 is released. In using the holder H to grasp a pan, the movable member 14 is drawn away from the stationary member 12 a distance greater than the diameter of the pan to be held, after which the handle 45 is slowly released thereby permitting the spring 70 to draw the movable member 14 towards the stationary member 12 and grip the pan in a manner aforedescribed. When the members 12 and 14 are in such gripping position, the pan P is held with a firm, positive grip. However, with the members 12 and 14 in such gripping position, an even tighter grip may be achieved by pushing the handle, or lug, 45 (and thence the movable member 14) a slight distance towards the stationary member 12, thereby increasing the tension in the gripping fingers and the flexible bases of the members 12 and 14 to effect such extra tight grip.

A suitable stop means, such as the C-shaped channel member 76, may be disposed in the end 19 of the frame 10, as shown, and functions as a stop to arrest movement of the bracket 42 (and the member 14) away from the member 12.

Thus, with the present construction, the holder H firmly and effectively grips the pan P under all operating conditions. Such firm grip is, in effect, self-energizing, such self-energization being effected by the coaction of the spring 70 biasing the member 14 toward the member 12, the flexure characteristics of each of the base portions 30 and 52 which enable such bases to conform to the configuration of the pan being held as aforedescribed, and the longtitudinal flexing of the fingers 32 and 54 which permits the fingers to tightly grip the edge of the pan.

In the construction of the gripping members 12 and 14, it may be desired to have a greater number of gripping fingers on the members to increase the holding power of the pan holder H. This may be accomplished by forming each of the members 12 and 14 of a generally elongated arc-shaped resilient material having a plurality of spaced vertical slits or cuts formed therein in place of the slots 80. By cutting a suitable number of slits and spacing the same on the gripping members in a preselected manner, any suitable number of gripping fingers may be formed.

The terms and expressions which have been employed are used as terms of description, and not of limitation, and there is no intention in the use of such terms and expressions of excluding any equivalents of the features

Having thus described my invention, I claim:

1. A pan lifting device comprising an elongated horizontally disposed handle, a stationary pan gripping member depending therefrom, a movable pan gripping member depending from and slidably disposed on the handle for movement longitudinally of the handle toward and away from the stationary member, each of said gripping members comprising an elongated resilient base secured between its ends to the handle and having its ends free, each base being curved about a generally upright axis so as to be concave toward the other base, and each base having a row of individual depending resilient circumferentially spaced pan gripping fingers thereon, said fingers having free lower ends, respectively, the row of fingers of each base including end fingers arranged one near each end of the associated base and a plurality of additional fingers between the end fingers, each base being resilient for flexing about its axis of curvature to conform readily to the curvature of the pan when the members are moved toward each other under light pressure, and the said fingers having pan holding hook portions at their lower ends, respectively, said fingers of each member being individually resiliently flexible transversely of their length about generally horizontal axes, respectively, toward and away from the fingers of the other member in a manner to engage the hook holding portions with the pan as the members are moved toward each other, whereby as a result of the flexure of the bases and the flexure of the fingers relative to the bases, all of the hook portions snugly engage the pan.

2. A device according to claim 1 wherein the movable pan gripping member is slidably disposed on the handle by a mounting comprising a U-shaped bracket having depending legs at its ends and disposed on the handle intermediate the ends thereof for longitudinal movement endwise toward and away from the stationary member, the movable gripping member being dependently secured to that leg of the bracket nearest the stationary gripping member, and the other leg of the bracket forming a handle for moving the bracket and the attached movable gripping member toward and away from the stationary gripping member.

3. A device according to claim 1 wherein a resilient coil spring tensionally operatively connects the members for yieldably moving them relatively toward each other and has sufficient strength to cause the fingers and bases to flex when pressed by the spring against a pan to be lifted.

4. A device according to claim 1 wherein the axes of curvature of the members are slightly divergent from each other downwardly from the handle.

5. A device according to claim 1 wherein each member is a single strip of sheet metal.

References Cited in the file of this patent

UNITED STATES PATENTS

| | | |
|---|---|---|
| 554,545 | Shaffer | Feb. 11, 1896 |
| 595,530 | Diffenderfer | Dec. 14, 1897 |
| 950,189 | Ray | Feb. 22, 1910 |
| 1,213,882 | Kettell | Jan. 30, 1917 |
| 1,683,190 | Hughey | Sept. 4, 1928 |
| 1,886,473 | Dries | Nov. 8, 1932 |
| 1,919,469 | Keizer | July 25, 1933 |
| 2,002,149 | Kneeland | May 21, 1935 |
| 2,093,658 | Hildenbrand | Sept. 21, 1937 |
| 2,127,038 | Lehew | Aug. 16, 1938 |
| 2,173,709 | Campbell | Sept. 19, 1939 |
| 2,227,913 | Rutkowski | Jan. 7, 1941 |
| 2,527,847 | Plitt | Oct. 31, 1950 |
| 2,738,214 | Zimmers | Mar. 13, 1956 |